(12) United States Patent
Andersson et al.

(10) Patent No.: US 6,550,859 B1
(45) Date of Patent: Apr. 22, 2003

(54) BACKREST DEVICE FOR A VEHICLE SEAT

(75) Inventors: Torsten Andersson, Öckerö (SE); Björn Lundell, Göteborg (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/554,652

(22) PCT Filed: Nov. 16, 1998

(86) PCT No.: PCT/SE98/02060

§ 371 (c)(1), (2), (4) Date: Sep. 13, 2000

(87) PCT Pub. No.: WO99/29536

PCT Pub. Date: Jun. 17, 1999

(30) Foreign Application Priority Data

Nov. 20, 1997 (SE) ................................ 9704251

(51) Int. Cl.⁷ ................................ B60N 2/42
(52) U.S. Cl. ........................ 297/216.14; 297/452.52; 267/168
(58) Field of Search ........................ 297/216.13, 216.14, 297/452.49, 452.52; 267/166.1, 168, 170

(56) References Cited

U.S. PATENT DOCUMENTS 3,880,414 A * 4/1975 Smith et al. ................. 267/168
4,037,829 A * 7/1977 Crosby et al. ............... 267/110

FOREIGN PATENT DOCUMENTS

| GB | 1 391 644 | 4/1975 |
| GB | 2 095 365 A | 9/1982 |
| WO | 95/11818 | 5/1995 |

* cited by examiner

Primary Examiner—Peter R. Brown
(74) Attorney, Agent, or Firm—Lerner, David, Littenberg, Krumholz & Mentlik, LLP

(57) ABSTRACT

Backrests for vehicle seats are disclosed including a support attached to a frame including a plurality of resilient springs and a corresponding plurality of stroke limiters for permitting the resilient springs to move through a predetermined stroke and absorb a load within a first load range and limiting further stroke of the resilient springs within a second load range, one of the resilient springs and the stroke limiters including a fastener for attachment to the frame and one of the resilient springs and stroke limiters including a second fastener for attachment to the support.

2 Claims, 4 Drawing Sheets

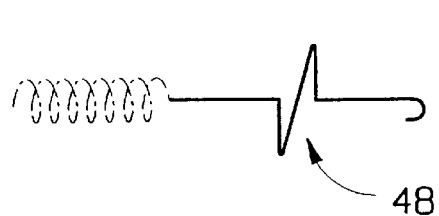
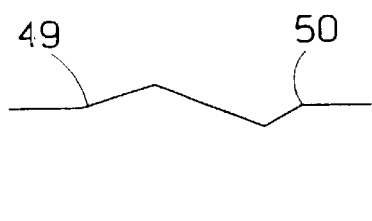
FIG.10  FIG.11
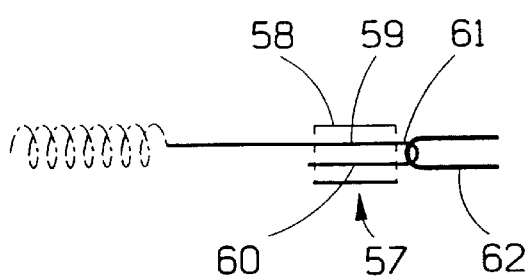
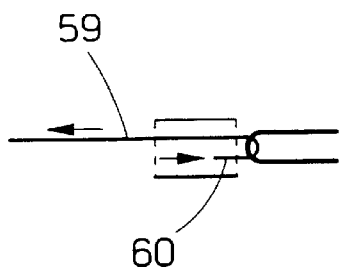
FIG.12  FIG.13
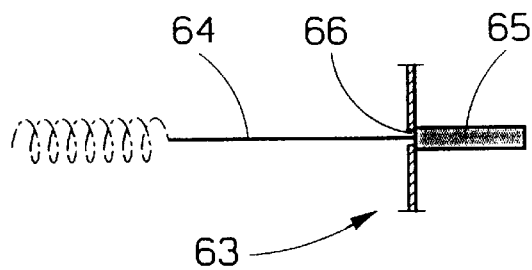
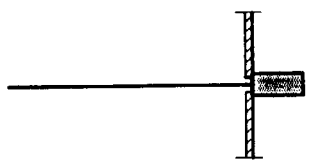
FIG.14  FIG.15
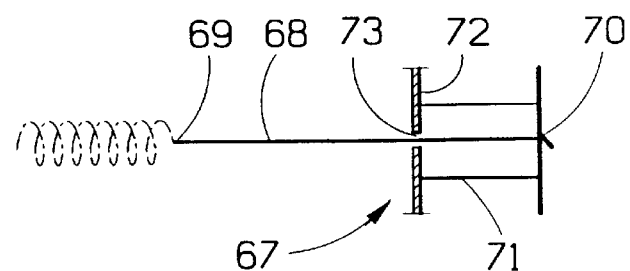
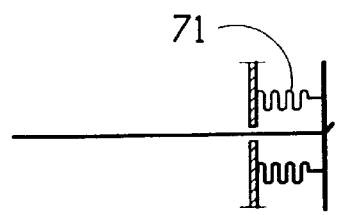
FIG.16  FIG.17

BACKREST DEVICE FOR A VEHICLE SEAT

FIELD OF THE INVENTION

The present invention relates to apparatus for a vehicle seat backrest.

BACKGROUND OF THE INVENTION

Conventional backrests for vehicle seats are provided with resilient compliant means having only a comfort function, i.e. they are functional to provide an even and comfortable support for the passenger's back and will adapt to normal back motions during a normal state of use. In case of a rear-end collision, the back will be subjected to excessive rearwards movement in the backrest, and, furthermore, accumulation of resilient energy will cause the back to recoil forward, creating a risk of so called whiplash injuries.

From International Application No. WO 95/11818 a backrest is known, which has been designed with the aim of reducing whiplash injuries caused by rear-end collisions. According to the prior art, this has been achieved by arranging separate stroke-limiting means, such as bands or links having attachment points separate from the fastening points of the springs. The means of attachment and the design of the spring means and the stroke-limiting means are very critical with regard to the total function of compliance of the backrest, for normal loads as well as extreme loads, such as during a collision.

An object of the present invention is to provide apparatus for a backrest in which the compliant members can have accurately specified properties.

SUMMARY OF THE INVENTION

In accordance with the present invention, this and other objects have now been realized by designing the compliant member of such backrests with each spring member and stroke limiting member being integral components which can be produced with specified properties with respect to their compliance characteristics.

In accordance with the present invention, applicants have invented a backrest for a vehicle seat comprising a frame defining a central zone, a support member, a plurality of compliant members for supporting the support member within the central zone, whereby the compliant members and the support member can absorb the load from a person seated in the vehicle seat, the plurality of compliant members comprising a resilient spring member and a corresponding stroke-limiting member for permitting the resilient spring member to move through a predetermined stroke and absorb a load within a first load range and limiting further stroke of the resilient spring member within a second load range, one of the resilient spring member and the stroke-limiting member including a first fastener for attachment to the frame and one of the resilient spring member and the stroke-limiting member including a second fastener for attachment to the support member. In a preferred embodiment, at least one of the plurality of compliant members comprises a plastically compliant member whereby the one of the plurality of compliant members exhibits plastic compliance at a load exceeding the second load range. Preferably, the plastically compliant member is disposed in series with one of the resilient spring members. In another embodiment, however, the plastically compliant member is disposed in parallel with one of the resilient spring members. Preferably, one of the stroke-limiting members is disposed in series with the plastically compliant member.

In accordance with one embodiment of the backrest of the present invention, the backrest includes stroke-limiting means for limiting further stroke of the resilient spring member within a third load range above the load exceeding the second load range.

In accordance with another embodiment of the backrest of the present invention, the resilient spring member comprises a coil-type compression spring and wherein the stroke-limiting member comprises first and second fastening members, the first fastening member including a first end including the first fastener and the second fastening member including a first end including the second fastener. In a preferred embodiment, the first and second fastening members extend through the coil-type compression spring, the first fastening member including a second end attached to one end of the coil-type compression spring and the second fastening member including a second end attached to the other end of the coil-type compression spring, whereby motion of the first and second fastening members causes compression of the coil-type compression spring such that stroke-limiting occurs upon complete compression of the coil-type compression spring.

BRIEF DESCRIPTION OF THE DRAWINGS

In the following, detailed description, the present invention will be described in detail with reference to the accompanying drawings, in which:

FIG. 10 is a front elevational view of a plastically compliant member in accordance with one embodiment of the present invention;

FIG. 11 is a front, elevational view of the plastically compliant member shown in FIG. 10 under an extreme load;

FIG. 12 is a front, elevational view of plastically compliant member in accordance with another embodiment of the present invention;

FIG. 13 is a front, elevational view of the plastically compliant member of FIG. 12 under an extreme load;

FIG. 14 is a front, elevational view of a plastically compliant member in accordance with another embodiment of the present invention;

FIG. 15 is a front, elevational view of the plastically compliant member of FIG. 14 under an extreme load;

FIG. 16 is a front, elevational view of the plastically compliant member in accordance with another embodiment of the present invention; and FIG. 17 is a front, elevational view of the plastically compliant member of FIG. 16 under an extreme load.

DETAILED DESCRIPTION

Figure 1:
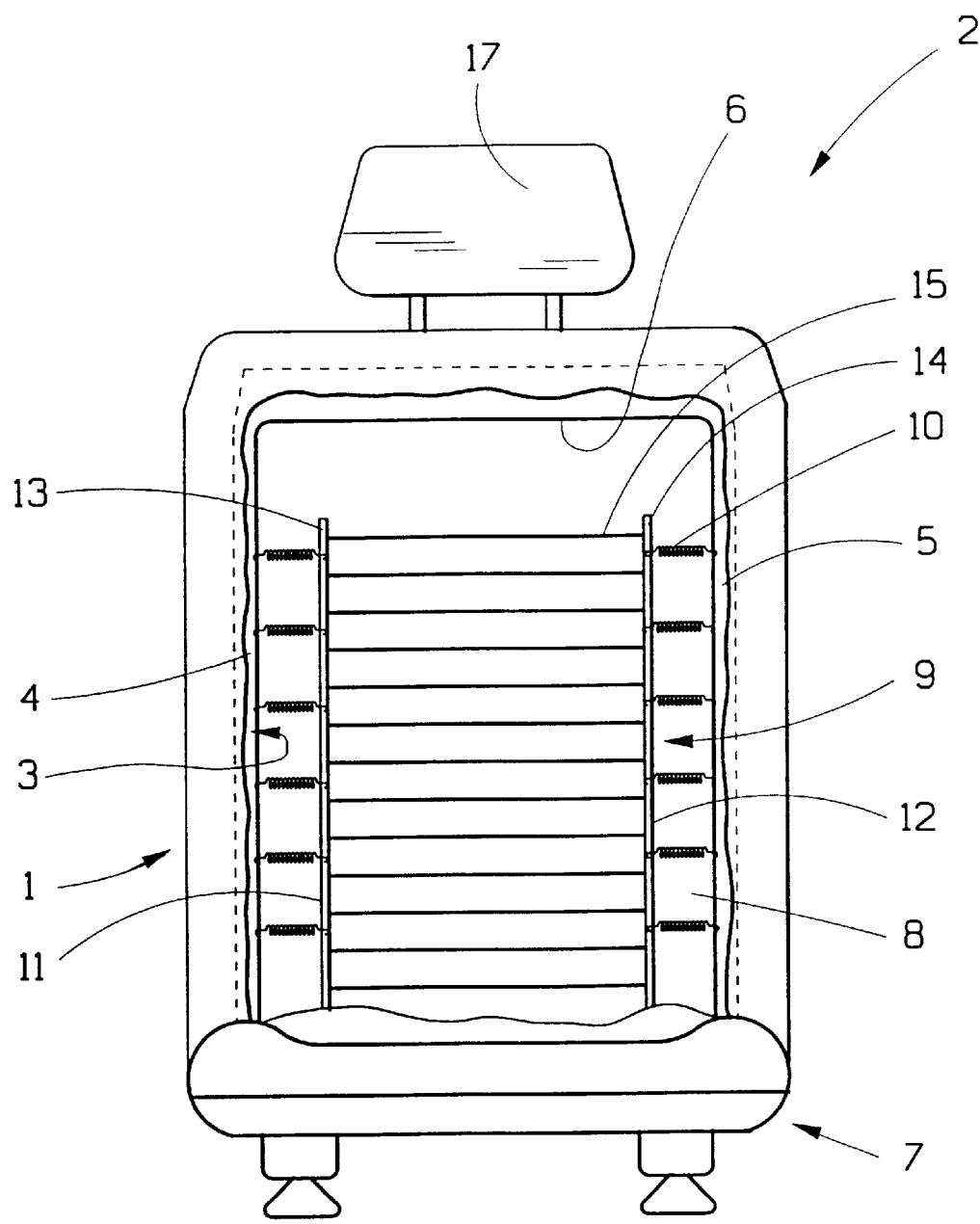
FIG. 1 is a front, elevational, schematic, partially cutaway view of a vehicle seat provided with a backrest according to the present invention.

Referring to the Figures, in which like reference numerals refer to like elements thereof, FIG. 1 shows, schematically, the construction of a backrest 1 in a vehicle seat 2 for a motor vehicle. The figure shows that the backrest 1 is generally constructed as a frame 3 having two side members, 4 and 5, and a top member 6. The backrest extends conventionally upward from the rear edge of a seat member 7 of the vehicle seat and is attached thereto by a lockable joint for adjustment of the inclination of the backrest 1. The frame encloses an area 8, in which a support member 9 is suspended. The support member is arranged to be flexibly suspended in the frame by means of a multitude of resiliently compliant members 10, attached between the support member and the frame. These members comprise the load-carrying elements of the backrest, which are embedded in a cushion of well-adjusted softness and enclosing upholstery. In FIG. 1, the compliant members 10 are, for the sake of simplicity, shown as simple tension springs, which are, however, according to the present invention, integrated with other elements, as will be described in greater detail below.

The support member 9 preferably consists of a flexible webbing, so called net webbing or pullmaflex webbing, i.e. a flexible, compliant unit functioning to absorb the load emanating from the back of a person sitting in the vehicle seat. This is performed in cooperation with the compliant members, in the illustrated example being attached between the two side members, 4 and 5, of the frame, and the support member 9. The latter is, in the illustrated example, of rectangular shape having two side edges, 11 and 12, spaced from the frame side members, 4 and 5, respectively. The compliant members extend, in the illustrated example, from the respective side member, 4 and 5, of the frame 3 to the neighbouring side edge, 11 and 12, of the support member 9. The support member in the illustrated example consists of two rigid wires or rods, 13 and 14, forming its side edges, 11 and 12, with a multitude of flexible threads 15 stretched between the rods.

The compliant members 10 are provided at each end with fastening elements, attached to fastening points in the frame 3 and the support member 9, respectively. The fastening elements consist of, for example, hook-shaped elements, hooked into holes in the frame, and around the rods, 13 and 14, respectively. Through the compliance of the compliant members, a difference s in the distance between the fastening elements is allowed when absorbing, mainly in the longitudinal direction of the compliant members, the load and the movement which is generally directed towards the support member, i. e. being directed transversely thereto and thus to the longitudinal direction of the members. Above the backrest there is a head restraint 17, which may be of conventional design but is of major importance regarding the supporting function during extreme load, such as during a rear-end collision caused by another vehicle.

Figure 2:
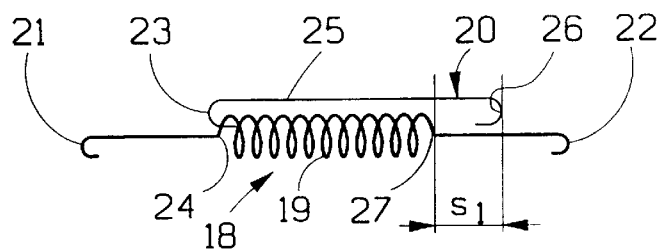
FIG. 2 is a front, elevational view of a compliant member provided with stroke-limiting members in accordance with the present invention.

FIG. 2 illustrates a first example of a compliant member, in this example designated 18 and comprising on one hand a spring member 19 and on the other hand a stroke-limiting member 20, integrated with the spring member. The compliant member exhibits a hook-shaped fastening element, 21 and 22, at each end, for attachment either to the frame 3 or to the support member 9, or vice versa. The spring member 19 is comprised of a tension type coil spring, for example made of coil wound spring steel wire, continuing at its ends into the fastening elements, 21 and 22. The stroke-limiting member 20 is at one end 23 fastened to one end 24 of the spring member, and extends along the latter with a straight portion 25, being principally of fixed length and having a stop 26 in the form of a hook-like portion, located at a predetermined distance $s_1$ from the other end 27 of the spring member in its unloaded condition. The stroke limitation is achieved by the end 27 of the spring member being pulled out the distance $s_1$ in the excessively loaded condition of the compliant member, whereby the hook-like portion 26 hooks into the winding of the spring member at its end 27.

Figure 3:
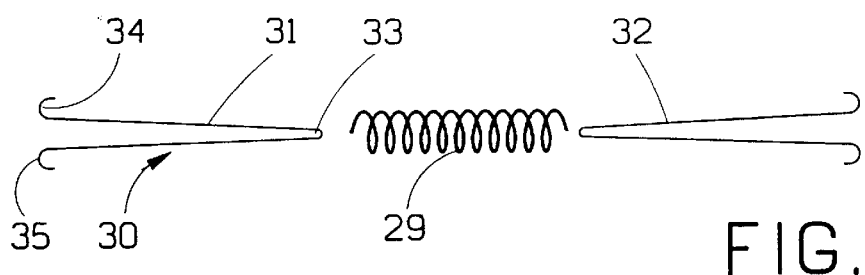
FIG. 3 is a front, elevational, exploded view of a compliant member provided with stroke-limiting members in accordance with the present invention.
Figure 4:
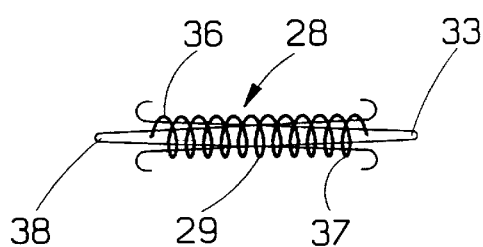
FIG. 4 is front, elevational view of a compliant member provided with a stroke-limiting member in accordance with the present invention.

FIGS. 3 and 4 illustrate another example of a compliant member, in this case designated 28. For the sake of clarity, the compliant member is shown in an exploded view in FIG. 3, whereas FIG. 4 shows the assembled member. The spring member 29 is in this case a compression spring in the form of a coil spring, which in the illustrated unloaded condition is expanded. The stroke-limiting member 30 is created indirectly in this example, by two identical parts, 31 and 32, in the shape of V-bent wire sections, meeting at their tip ends 33, creating fastening elements for the compliant member and being attached to the remote end of said spring member 29. At their opposite ends, two hook-like sections, 34 and 35, are provided. As is shown in FIG. 4, in the assembled compliant member 24, the two elements, 31 and 32, are passed through the spring member 29, one from each side, with the tip end 33 leading, until the hook-like sections, 34 and 35, in practice hook onto the respective ends, 36 and 37, of the spring member 29. The two tip ends, 33 and 38, thus each create one fastening element of the assembled component, to be attached to the frame 3 or the support member 9, respectively. Consequently, in this case the two elements, 31 and 32, as such are not stroke-limiting members, but are creating a stroke limitation by causing an inverted movement of the spring member, i.e. a pulling load between the fastening elements, 33 and 38, creates a pushing load on the spring member 29, because the hook-like sections, 34 and 35, by hooking onto the ends, 36 and 37, of the spring member compresses the latter until it "bottoms out", i. e. reaches a butt contact end position, which creates the stroke limitation.

Figure 5:
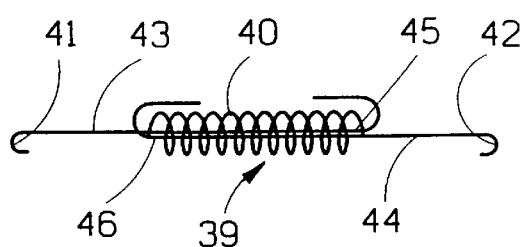
FIG. 5 is a front, elevational view of compliant member provided with a stroke-limiting member in accordance with another embodiment of the present invention.

A variant compliant member 39 is illustrated in FIG. 5, in which the spring member 40 is a coil type compression spring, shown in its unloaded condition and exhibiting hook-like fastening elements, 41 and 42, extending by means of straight wire sections, 43 and 44, through the spring member and being equipped also at their opposite ends with hook-like-elements, 41' and 42', which are each hooked onto that end, 45 and 46, respectively, of the spring member which is located opposite the corresponding fastening elements, 41 and 42. The same function as in the embodiment of FIG. 4 is obtained, i.e. a pulling of the fastening elements, 41 and 42, entails a compression of the spring element 40 until it "bottoms out," whereby a stroke limitation is achieved.

Figure 6:
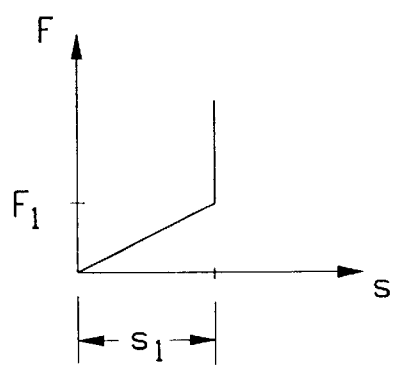
FIG. 6 is a diagrammatic representation of the characteristics of compliant member in accordance with FIGS. 2–5.

FIG. 6 schematically shows the characteristics of the above discussed compliant members, whereby the compliant movement of the compliant member is designated by s and the load is designated by F. The compliant movement is, in the illustrated example, proportional to the load, but may also be progressive, up to a travelled distance $s_1$, which range of movement is used during normal loads from the person's back, i.e. during normal conditions of vehicle use within a first load range, up to a limit load $F_1$. By extreme load, such as during a rear-end collision, the limit load $F_1$ is exceeded, and the maximum movement stroke $s_1$ is reached, causing the stroke-limiting member to be activated, so that the distance of movement will not increase in spite of increasing load. Through this action, the compliant members are prevented from yielding further, whereby the support member will not allow the person's back to sink further into the backrest, thereby reducing the risk of a whiplash injury.

Figure 7:
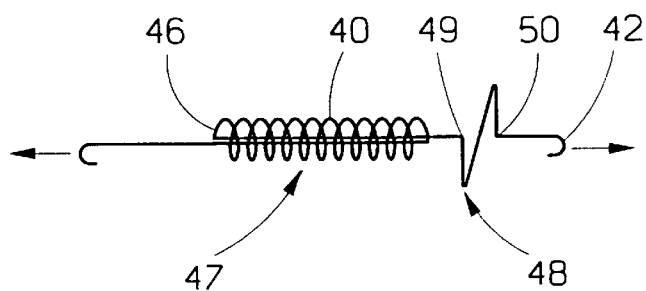
FIG. 7 is a front, elevational view of a compliant member provided with the stroke-limiting member and a plastically compliant member in accordance with another embodiment of the present invention.

FIG. 7 illustrates a compliant member 47 constructed from three integrated members influencing the compliance, that is, besides the spring member 40 and the stroke-limiting member, a plastically compliant member 48, in this example being arranged in series with the other two members. In the example shown in FIG. 7, the spring member 40 and the stroke-limiting member is of a design similar to that of FIG. 5, but it may alternatively be of a different design, for example according to the examples illustrated in FIGS. 2 and 3. The plastically compliant member 48 is integrated into the straight section between the attachment point at the end of the spring member 46 and the attachment point 42 of the compliant member, and is in the illustrated example designed, in relation to the resilient member 40, as a highly shape-resistant, Z-shaped or spiral-shaped loop. Its shape resistance is dimensioned such that the distance between its two end points, 49 and 50, remains generally constant, on one hand during normal use, i.e. a first load range, and on the other hand during a second load range of elevated load, during stroke limitation. If the load increases even further, the plastically compliant member will yield plastically until the distance between the two points 49 and 50 reaches an end position, at which the plastic deformation ceases and a further stroke limitation will occur for still higher loads.

Figure 8:
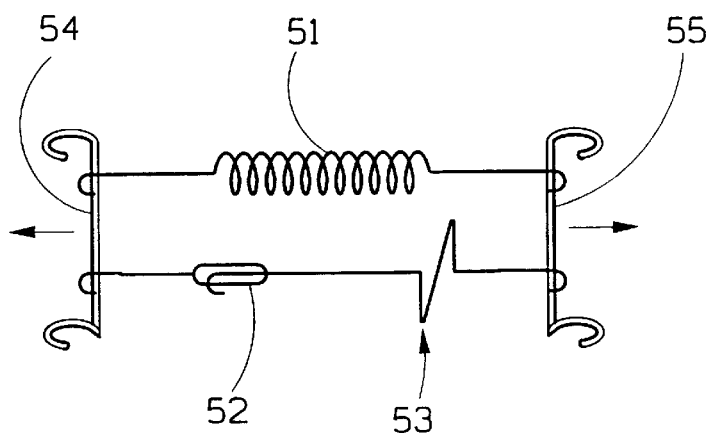
FIG. 8 is a front, elevational view of a complaint member provided with a stroke-limiting member and with a plastically compliant member in accordance with another embodiment of the present invention.

FIG. 8 illustrates an alternative example with a spring member 51 in the form of a tension spring and, in parallel thereto, is attached both a stroke-limiting member 52 and a plastically compliant member 53 connected in series with each other. One end of the spring member and the corresponding end of the stroke-limiting member exhibit a common fastening member 54, while the opposite end of the spring member and the external end of the plastically compliant member also exhibit a common fastening member 55.

Figure 9:
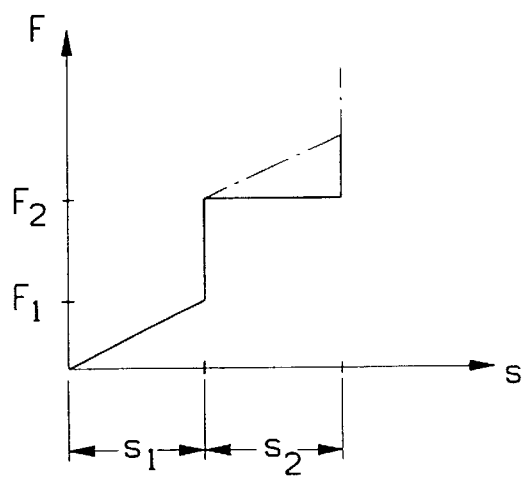
FIG. 9 is a diagrammatic representation of the characteristics of the compliant members shown in FIGS. 7 and 8.

FIG. 9 shows, schematically by means of a diagram, characteristics of the compliant members of the type illustrated by examples in FIGS. 7 and 8, i. e. exhibiting a spring member as well as a stroke-limiting member and a plastically compliant member. During a primary, normal load range, the resilient compliance thus takes place over a distance of movement up to the distance $s_1$, whereupon the stroke limitation occurs at a load limit $F_1$. In case of further load inside a range up to the load $F_2$ no compliance occurs, whereupon the plastically compliant member will be activated up to a predetermined distance $s_2$, after which a second stroke limitation will occur in case of further increased load. In the case of FIG. 9, a resilient compliance will, however, remain also for loads above $F_2$, which is indicated by a dot-dashed line.

FIG. 10 shows an independent view of the plastically compliant member 48 of FIG. 7. The plastic deformation and absorption of energy will thus occur at a certain load, at which the bent or spirally wound wire will be straightened out so that the distance between the two points, 49 and 50, will increase to a maximum value, changing the compliance by a distance $s_2$.

The example according to FIGS. 12 and 13 shows an alternative embodiment of the plastically compliant member, designated by reference numeral 57. In this example, that member is designed as a wire extending in a tube 58, having a forward portion 59 and a return portion 60. This creates an end portion 61 that can function as a fastening element for attachment either to the frame of the vehicle seat or to the support member and which may for example consist of an eye 62. The plastic compliance will occur at a certain tension load in the forward portion 59, which is attached to the spring member of the compliant member, forcing the return portion 60 to yield through bending and subsequent straightening.

FIGS. 14 and 15 show a further example of a plastically compliant member 63, consisting of a wire portion 64, which at one end is attached to the spring member, e.g. a tension spring, and at the other end 65 has a lager diameter, which is furthermore larger than a hole 66, through which the wire 64 will stretch and be pulled out at a predetermined excessive load. The plastic compliance is created by the thicker portion of the wire being plastically deformed by passing through the hole 66.

FIGS. 16 and 17 illustrate a further example of the plastically compliant member 67. In this example, one end 69 of a wire portion 68 is attached to the spring member and the other end 70 is fastened to the remote end of a deformable distance element 71 that is attached to a plate 72 having an opening 73 through which the wire extends. The distance element is, for example, designed as a cylinder, which, at the predetermined overload, will buckle and allow the end 70 to travel in the direction of said plate 72.

To summarise, various examples of compliant members, for attachment between the frame 3 and the support member 9 in the backrest of a vehicle seat have been demonstrated and described. Without exception, the compliant members have been designed as integrated components having resilient and stroke-limiting members, and in some cases also plastic members, arranged to have a common point of attachment for each component, to the frame and the support member, respectively, and being arranged either in series or parallel, or in a combination of series and parallel connection. The compliant members are mainly made of a wire material and can be dimensioned for providing specific properties regarding compliant movement and load limits.

The compliant members 10 have, during normal use, i.e. normal use of the vehicle, only a comfort function, whereby they provide, together with the support member, in co-operation with stuffing and upholstery of the backrest, an even support for the back, and compliance for normal movement of the back. During extreme loads, such as a rear-end collision, the compliant members 10 provide a load-absorbing function and a recoil-dampening function, on one hand preventing the back from being pressed too far into the backrest 1, and on the other hand not recoiling forward in a limited movement, which might otherwise entail detrimental loads on the spinal column and the neck vertebrae, when combined with the more limited compliance of the head restraint.

The present invention is not limited to the examples shown in the drawings and described above. The number of compliant members 10 between the frame 3 and the support member 9, and their location may vary from seat to seat. For example, compliant members may also be attached between the top member and the support member 9. The latter may further be constructed in a different way. At the lower portion of the majority of backrests, an adjustable sway-back support is provided, which should have a larger compliance than the compliant members during extreme load, in such a manner that the sway-back support will not prevent the above discussed compliance of the backrest as a whole.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A backrest for a vehicle seat comprising a frame defining a central zone, a support member, a plurality of compliant members for supporting said support member within said central zone, whereby said compliant members and said support member can absorb the load from a person seated in said vehicle seat, said plurality of compliant members comprising a resilient spring member and a corresponding stroke-limiting member for permitting said resilient spring member to move through a predetermined stroke and absorb a load within a first load range and limiting further stroke of said resilient spring member within a second load range, one of said resilient spring member and said stroke-limiting member including a first fastener for attachment to said frame and one of said resilient spring member and said stroke-limiting member including a second fastener for attachment to said support member, wherein at least one of said plurality of compliant members comprises a plastically compliant member whereby said one of said plurality of compliant members exhibits plastic compliance at a load exceeding said second load range, wherein said plastically compliant member is disposed in series with one of said resilient spring members.

2. A backrest for a vehicle seat comprising a frame defining a central zone, a support member, a plurality of compliant members for supporting said support member within said central zone, whereby said compliant members and said support member can absorb the load from a person seated in said vehicle seat, said plurality of compliant members comprising a resilient spring member and a corresponding stroke-limiting member for permitting said resilient spring member to move through a predetermined stroke and absorb a load within a first load range and limiting further stroke of said resilient spring member within a second load range, one of said resilient spring member and said stroke-limiting member including a first fastener for attachment to said frame and one of said resilient spring member and said stroke-limiting member including a second fastener for attachment to said support member, wherein at least one of said plurality of compliant members comprises a plastically compliant member whereby said one of said plurality of compliant members exhibits plastic compliance at a load exceeding said second load range, said stroke-limiting member including stroke-limiting means for limiting further stroke of said resilient spring member within a third load range above said load exceeding said second load range.

* * * * *